Dec. 4, 1956     G. WÜNSCH ET AL     2,772,687
PRECISION GALVANOMETER
Original Filed Oct. 19, 1950
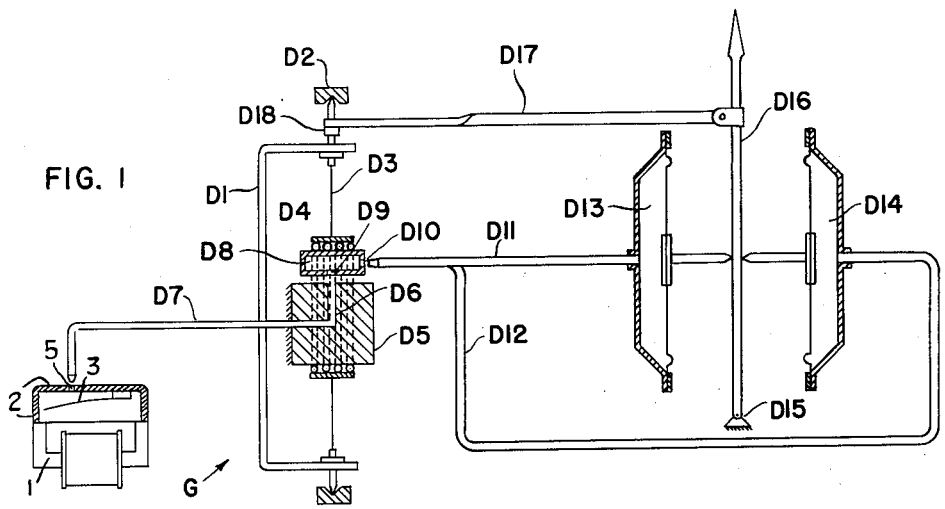
FIG. 1
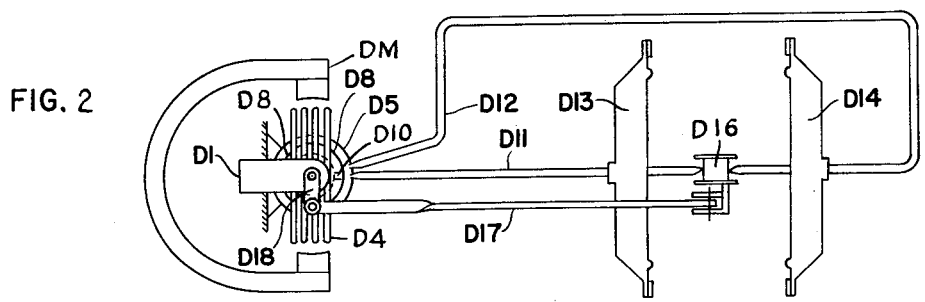
FIG. 2
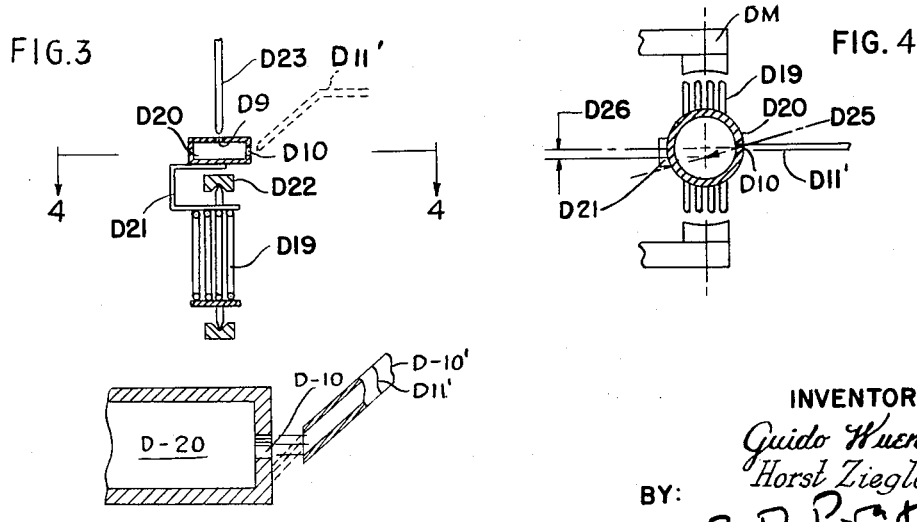
FIG. 3
FIG. 4
FIG. 5
INVENTOR:
Guido Wuersch
Horst Ziegler
BY: F. D. Prager
Atty.

United States Patent Office 2,772,687
Patented Dec. 4, 1956

2,772,687
PRECISION GALVANOMETER

Guido Wünsch and Horst Ziegler, Berlin, Germany, assignors to Askania-Werke, A. G., a corporation of Germany Original application October 19, 1950, Serial No. 191,958. Divided and this application February 24, 1953, Serial No. 340,000

Claims priority, application Germany (U. S. Zone) October 29, 1949

7 Claims. (Cl. 137—83)

This application is a division of application Serial No. 191,958, filed Oct. 19, 1950, now abandoned.

This invention relates to galvanometers. The invention provides a means for rapidly and safely applying the response of the sensitive measuring device to an indicator or controller absorbing appreciable energy in its operation.

It is known that there are conflicts between the requirements that the measurement be sensitive, the transmission rapid, the response powerful and reliable and the entire instrumentation economical. For the solution of such conflicts the invention provides a new, pneumatic low pressure system of transmitting or transforming measuring impulses.

This pressure system is very simple, economical and effective. Standard alternating currents with frequencies such as 60 cycles per second can be used to generate the air pressure, without the use of check valves or other expensive or delicate parts. Undesired friction, reaction forces and other side effects of the pneumatic transmission medium are practically eliminated. The inherent pneumatic time lag can be kept unusually small.

The elimination of undesired friction etc. is achieved particularly by the expedient of rigidly mounting a small and light fitting or guide box for the penumatic transmission medium directly upon the galvanometer coil, for movement therewith, and effecting both introduction and discharge of the pneumatic medium, relative to said fitting or box, across a small air gap and without mechanical connection, as will be described in detail hereinafter.

The invention will be more clearly understood upon consideration of the following description, based on a few applications thereof which we have found successful in practice and which are illustrated diagrammatically in the drawing. Figures 1 and 2 are, respectively, the elevation and plan view of a galvanometer constructed in accordance with this invention. Figures 3 and 4 are, respectively, the elevation and plan view of slightly modified details of such a galvanometer. Figure 5 is an enlarged detail from Figure 4.

Figures 1 and 2 show a galvanometer using the new principle of generating a response from a sensitive measurement.

Forces involved in measurements of small electric currents are feeble. Various arrangements are known utilizing an auxiliary force. The main difficulty is that the auxiliary force must not impose any friction and other objectionable effect upon the sensitive mechanism of the galvanometer.

Heretofore the only practical solution of the problem has been furnished by a system wherein a light ray was controlled by a light-weight reflector or resrictor member on the galvanometer; the ray then being directed into a photo-electric cell. Such photo-electric analysis is not only expensive but mainly delicate and not very safe or reliable for a prolonged period of practical operation.

Pneumatic auxiliary forces are much safer and cheaper in application; and it is known to utilize such forces, in socalled jet pipe relays. Friction and reaction are not very great in such relays. The reaction force is usually about a thousandth of an inch-pound. This is still much more than can be tolerated in a galvanometer mechanism.

The present galvanometer uses an auxiliary force which is ten thousand to hundred thousand times smaller, thereby proportionally reducing the objectionable forces of reaction and friction. It uses a pneumatic, auxiliary force, which can be applied much more economically and safely than for instance an electric force, and which can be multiplied or amplified by a diaphragm without appreciable cost.

The galvanometer comprises a yoke D-1 pivoted in bearings D-2 and carrying, by means of taut wires D-3, the electric coil D-4, suitably connected with the source of current by conductors (not shown) and mounted between the poles of a magnet D—M. The galvanometer core D-5 has a central, vertical passage D-6, concentric with the bearings D-2 and communicating with a low-pressure, vibrator type compressor G by a duct D-7.

Spaced above and concentrically with the passage D-6, there is a small, flat, cylindrical box D-8, secured to the inside of the galvanometer coil D-4. This box serves as a pressure switch. For this purpose it is shown as formed of and surrounded by thin inperforate airtight wall means, said wall means having a central vertically facing air inlet port D-9 in its underside, opposite the passage D-6, and a laterally facing air outlet port D-10 in its side. It will be seen that such a box can be made very simply, that it can be very light, and that its weight can be disposed concentrically.

Directly opposite the outlet port D-10 two air catcher or jet relay receiver nozzles D-11, D-12 are arranged side by side. As shown in the present figure, these nozzles may be horizontal. They are disposed as close together as possible. It is usually necessary for practical purposes to separate the transmission lines connected to such nozzles, at least by a slight distance, therefore the two air catcher nozzles will usually be directed toward the outlet port D-10 with a little lateral angularity as shown.

The nozzles D-11, D-12 are connected respectively with diaphragm chambers D-13, D-14. The two diaphragms are arranged opposite each other. They actuate in opposite directions but with identical moments an indicator or recorder lever D-16, pivoted at D-15.

In the neutral position of the coil D-4, that is in the position wherein it is not subject to any electromagnetic torque and wherein no current passes through the coil, the outlet port D-10 is disposed between the air catchers D-11, D-12. Equal air pressures are therefore applied in both diaphragm chambers D-13, D-14. Application of an electric current to the coil D-4 causes a deflection of the coil relative to the field of the galvanometer magnet, thereby displacing the outlet port D-10 relative to the air catchers D-11, D-12. As a result one of these air catchers is under higher pressure than the other. The pressure differential is multiplied in the diaphragm chambers, and causes a shifting of the lever D-16, indicating the current. This indication can be recorded by well-known means (not shown).

The lever D-16 is connected by a link D-17 with a crank D-18 secured to a yoke D-1. The torque derived from the galvanometer coil is compensated by a mechanical force, derived from the pressure differential between the diaphragm chambers D-13, D-14 and applied to the galvanometer yoke D-1 by the linkage D-16, D-17, D-18.

Other compensating means, mechanical or electrical, are known. In the present embodiment the compensating mechanical linkage is so arranged as to return the coil to a neutral position by reverse rotation. Often an original more or less momentary deflection of the coil is caused by the current in the magnetic field of the galvanometer. The reverse rotation is effected by the auxiliary pneumatic force, which is most accurately and rapidly derived by the pressure generator as described.

The diaphragm chambers D-13, D-14 remain under a differential pressure, and the linkage continues to counteract the deflecting force, until the neutral position is re-established. The auxiliary pneumatic force is so selected and multiplied as to greatly exceed the deflecting force; thus the re-establishment of neutral position is rather prompt, although not necessarily momentary.

It will be noted that this powerful auxiliary force is applied without prejudice to the sensitivity of the galvanometer. The inherent reaction of the air-jets discharged through the outlet port D-10 is directed radially of the box D-8, as is the port itself; accordingly it has no moment with respect to the galvanometer mechanism. Nor is there any frictional resistance. The minute airflow involved is practically frictionless, mainly by virtue of its central application at D-9.

Small vibrations are caused by an air pressure generator G of the vibrator type, which desirably uses an electromagnet 1 actuated by ordinary 60 cycle current. Such a magnet 1 causes 120 vibrations per second in a ferromagnetic flat spring 3 opposite the magnet poles. The spring can be installed in a chamber 2 opposite the magnet. An opening 5 in the wall of this chamber serves to admit diffused air flows into the chamber each time the spring 3 is attracted by the magnet 1, and, whenever the spring is released by the magnet, to direct a small air jet into the duct D-7; thereby imposing vibrations on the box D-9, which are directed axially of the bearings D-2, and which are even capable of reducing the friction of said bearings.

In the modified form of Figures 3 and 4 a galvanometer coil D-19 has a pressure switch box D-20 secured to its outside by a bracket D-21, reaching beyond the upper bearing D-22. This arrangement allows the use of a standard galvanometer core (not shown) instead of the specially drilled core D-5; the air being supplied from the top by a duct D-23.

The air catcher part of the pressure switch may also be modified, in several respects.

As shown at D-11' in Figure 4 and more clearly shown at D-10' and D-11' in Figure 5, the air catcher nozzles, instead of lying in a horizontal plane as in Figures 1 and 2, can be inclined with respect to the horizontal plane in which the box D-20 rotates and in which the air jet is emitted therefrom. As a result, when a return current of air is discharged from one or the other of these air catchers, due to the reestablishment of pneumatic balance in the diaphragm chambers D-13, D-14, such return current does not enter the outlet port of the pressure switch box, wherein it would create a slight reaction to one side or the other due to said lateral angularity of the nozzles D-11, D-12.

On the other hand it may be desirable to impose a slight but positive reaction force upon the galvanometer, at all times and in a predetermined direction. As shown in Figure 4, this can be achieved without extra expense by drilling the outlet port D-10 through the wall of the pressure switch box so that it faces in a lateral direction D-25 having both radial and tangential components relative to the circular wall centered about the galvanometer axis. In this manner the reaction of the air jet, the magnitude of which is controlled by the pressure generated in element G, has a moment arm D-26, whereby it imposes a preset, directed, compensating force upon the galvanometer. Such a force may be utilized to bias the instrument in one direction; for instance in cases where the instrument is expected to begin acting (pre-acting) prior to the application of the normal positioning force; that is, prior to the application of the normal electric current to which the instrument shall respond.

Many other modifications will occur to persons skilled in the art upon consideration of the disclosure. We claim:

1. In a galvanometer having a coil deflectable relative to a field and about a vertical axis by a small electromagnetic torque, a deflection measuring device comprising wall means secured to the coil to form a hollow body deflectable with the coil; a vertically facing air inlet port, intersected by said axis, in said wall means; a laterally facing air outlet port, located laterally of said axis, in said wall means; jet supply means adapted to direct a vertical air flow along said axis and into the inlet port; and laterally facing jet relay received nozzle means opposite the air outlet port.

2. A galvanometer as described in claim 1 wherein said air outlet port faces in a lateral direction having both radial and tangential components relative to a circle centered about said axis.

3. A galvanometer as described in claim 1 wherein the air outlet port and the jet relay receiver nozzle means face in different lateral directions relative to a plane normal to said axis.

4. A galvanometer as described in claim 3 wherein said jet relay receiver nozzle means also face in different lateral directions within said plane.

5. A galvanometer as described in claim 1 wherein the jet supply means comprises a vibratory air impeller, adapted to make said air flow vibratory and thereby to vibrate said hollow body.

6. A galvanometer as described in claim 5 wherein the jet supply means comprises an electric magnet adapted to be energized by an alternating current, a chamber opposite the magnet, a ferromagnetic flat spring adapted to vibrate in the chamber when the magnet is energized, the wall of the chamber having an opening therein and an air duct leading from said opening to a position opposite the air inlet port of said hollow body.

7. A galvanometer as described in claim 6 comprising a stationary magnet on the inside of said coil to provide said field, said duct leading through said stationary magnet.

References Cited in the file of this patent

UNITED STATES PATENTS

| Re. 19,276 | Wunsch | Aug. 14, 1934 |
| 2,104,627 | Von Manteuffel | Jan. 4, 1938 |
| 2,250,341 | Wunsch | July 22, 1941 |
| 2,273,600 | Specht | Feb. 17, 1942 |
| 2,651,317 | Heinz | Sept. 8, 1953 |
| 2,670,464 | Wuensch et al. | Feb. 23, 1954 |

FOREIGN PATENTS

| 689,814 | France | Sept. 11, 1930 |